United States Patent

[11] 3,614,470

[72] Inventors Ross E. Ruthenberg
Des Plaines;
James C. Evitts, Jr., Schaumburg, both of Ill.
[21] Appl. No. 31,277
[22] Filed Apr. 23, 1970
[45] Patented Oct. 19, 1971
[73] Assignee Motorola Inc.
Franklin Park, Ill.

[54] SOLID-STATE RAMP GENERATOR FOR DEVELOPING A MODULATED RAMP SIGNAL IN A TANDEM SERRASOID MODULATOR
5 Claims, 4 Drawing Figs.

[52] U.S. Cl. .......... 307/228, 307/237, 307/246, 307/260, 307/268, 328/184, 332/9
[51] Int. Cl. .......... H03k 4/08
[50] Field of Search .......... 307/228, 229, 237, 246, 260, 268; 328/181, 184; 332/9

[56] References Cited
UNITED STATES PATENTS

| | | | |
|---|---|---|---|
| 3,041,470 | 6/1962 | Woodworth | 328/184 X |
| 3,303,359 | 2/1967 | Brisay, Jr. | 328/184 X |

*Primary Examiner*—Stanley D. Miller, Jr.
*Attorney*—Mueller & Aichele

ABSTRACT: A serrasoid phase modulator includes tandem modulation stages having a ramp generator with a linearizing circuit. In the ramp generator, an unwanted current pulse is transferred through the base-to-collector junction capacitance of a transistor. A capacitor across which the ramp signal developes is coupled to the collector of the same transistor. To prevent the ramp signal from being distorted by the current pulse, the ramp linearizing circuit is connected between the collector and the capacitor and utilizes the base-to-emitter drop of another transistor to isolate the capacitor from the unwanted current pulse.

Inventors
JAMES C. EVITTS JR.
ROSS E. RUTHENBERG
BY
Mueller and Aichele
ATTYS.

Inventors
JAMES C. EVITTS JR.
ROSS E. RUTHENBERG.
BY
Mueller and Aichele
ATTYS.

SOLID-STATE RAMP GENERATOR FOR DEVELOPING A MODULATED RAMP SIGNAL IN A TANDEM SERRASOID MODULATOR

BACKGROUND OF THE INVENTION

Subject matter disclosed in this application is disclosed and claimed in application Ser. No. 71,174, filed Sept. 10, 1970, which is a continuation-in-part of application Ser. No. 805,711, filed Mar. 10, 1969.

Tandem serrasoid phase modulator includes at least first and second modulating stages. The first modulating stage includes a ramp generator which applies a recurring ramp to one input of a first comparator and a modulation signal source which may apply an audio signal to the other input of the first comparator. In response to the ramp and the audio signals, the first comparator generates a first train of variable width pulses. The lagging edges of the pulses have a constant predetermined time interval therebetween. The timing of the leading edges of the pulses varies or is modulated according to the amplitude of the modulating signal. Next, a first train of variable position pulses is generated in response to the timing of the leading edges of the variable width pulses.

In the second modulating stage, the train of variable position pulses is utilized to trigger a second ramp generator which develops a modulated ramp signal. The audio signal is applied with this modulated ramp signal to a second comparator to modulate the leading edges of a second train of variable position pulses which may be either filtered to develop a phase-modulated radiofrequency (RF) signal or which is utilized to trigger a third, modulated ramp generator.

It has been suggested that a switchable, solid-state comparator employing bipolar transistors may be utilized to generate a modulated ramp signal for the foregoing system which has a greater amplitude than heretofore feasible in prior art embodiments. In one particular ramp generator of this kind, the first variable width pulse train is coupled through a preemphasis network to the base of a first transistor and through a deemphasis network to the base of a second transistor of the comparator. The preemphasis network decreases the amplitude of all but the leading and lagging edges of the pulse. The deemphasis network rounds off or decreases the amplitude of the leading and lagging edges of the pulses. The first transistor which is normally at a high-impedance level is switched to a low-impedance level during the short duration of time when the amplitude of the preemphasized input exceeds the amplitude of the deemphasized input. The low impedance of the first transistor discharges a capacitor connected to the collector thereof which then recharges until the next leading edge occurs thereby forming the modulated ramp signal.

Although the foregoing modulated ramp generator operates satisfactorily at lower frequencies, a problem arises if it is utilized to produce comparatively large amplitude ramp signals at frequencies around and above 4 MHz. During the time the first transistor is nonconductive and as the capacitor is recharging to form the linear rising portion of the ramp, a portion of the negative-going excursion of the preemphasized pulse is coupled through the collector-to-base capacitance of the transistor and applied to the capacitor thereby momentarily distorting the ramp signal. This distortion of the ramp results in distortion of the modulated wave thereby degrading the signal quality and interferring with the communications system in which the modulator is employed.

SUMMARY OF THE INVENTION

It is therefore an object of this invention to provide an improved serrasoid modulator for operating at high frequencies. A further object of this invention is to provide an improved modulated ramp generator for a tandem serrasoid phase modulator.

Another object of this invention is to provide an improved solid-state ramp generator which develops a linear modulated ramp having a large amplitude and a high frequency in response to a variable position pulse having a high frequency.

In brief, one embodiment relates to a ramp linearizing circuit for use in a solid state, modulated ramp generator employed in a tandum serrasoid modulator utilizing preemphasis and deemphasis techniques to generate a high frequency, phase modulated output. The linearizing circuit utilizes the base-to-emitter threshold of a linearizing transistor amplifier to eliminate distortion otherwise caused in the rising portion of a ramp signal by portions of the preemphasized signal being applied through the base-to-collector junction of a switching transistor to the ramp forming capacitor. A second amplifier is triggered by the output of the linearizing transistor to discharge the ramp forming capacitor, thereby generating the falling portion of the ramp. After being discharged, the capacitor recharges thus forming a linear, undistorted rising voltage ramp thereacross.

DESCRIPTION OF THE PREFERRED EMBODIMENT

Figure 1:
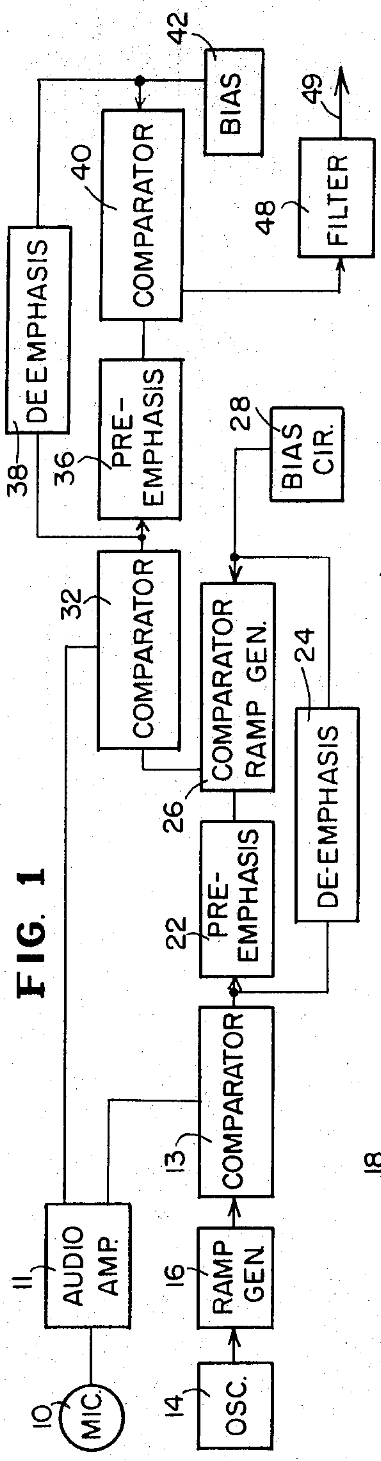
FIG. 1 is a block diagram of a tandem serrasoid modulator.

To facilitate understanding of the modulated ramp generator and the linearizing circuit therefore of one embodiment of the invention, the operation of a tandem serrasoid modulator in which the ramp generator is utilized will first be described. In FIG. 1, there is shown a block diagram of a tandem serrasoid modulator circuit. A microphone 10 produces an audio signal 11 (shown by B in FIG. 2) which is amplified by audio amplifier 12 and coupled to one input of comparator 13. Oscillator 14 produces a train of RF pulses 15 (shown by A in FIG. 2) which is coupled to ramp generator 16. Ramp signals 17 (shown by B in FIG. 2) which are generated by ramp generator 16 in response to RF pulses 15 applied thereto, are coupled to the other input of comparator 13.

Audio signal 11 and ramp signal 17 are compared in comparator 13 to develop comparator output signal 18 (shown by C in FIG. 2) which is comprised of a train of variable width pulses. By comparing the waveform of B and C in FIG. 2, it is apparent that when the amplitude of ramp signal 17 is less than the amplitude of audio signal 11, comparator 13 is in a first state and the amplitude of its output 18 remains at a low level. When the amplitude of ramp signal 17 rises above the amplitude of audio signal 11, comparator 13 shifts to a second state and the amplitude of output 18 switches to a high level. There is an equal time period between the lagging or trailing edges 19 of the pulses in train 18 because they occur coincidentally with the falling portions of ramp 17. Since audio signal 11 has a relatively low frequency as compared to the frequency of ramp signals 17, the audio signal does not change appreciably during a few ramp signals. However, over a relatively long period of time the audio signal will change and, therefore, the leading edges 20 of the pulses in pulse train 18 change position relative to the trailing edges 19 in response to the modulation from audio amplifier 12.

Figure 2:
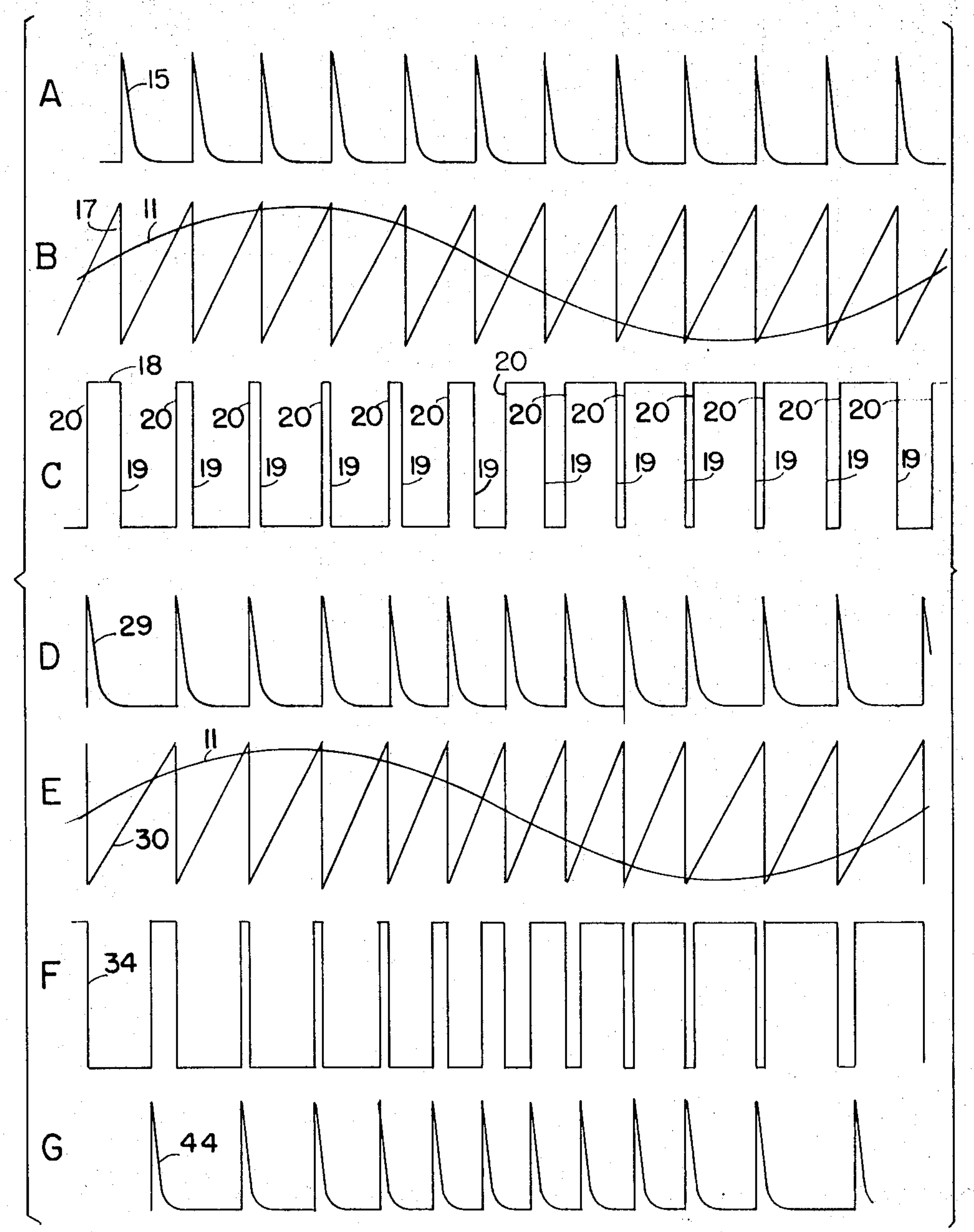
FIG. 2 shows a family of waveforms illustrating the operation of the system of FIG. 1.

The leading edges 20 of variable width pulses 18 are converted to pulses 29 whose positions change in response to audio signal 11 as shown by D in FIG. 2. This conversion has been achieved in the past by differentiating output 18 of comparator 13 and amplifying only the differentiated pulses that correspond to the moving or leading edge 20 while clipping off the undesired pulses corresponding to the stationary, trailing edge 19. If a high-frequency output is desired, pulse 29 must have a narrow width or short duration. Since the amplitude of the output of an RC-type differentiator is limited if a narrow pulse is desired, the foregoing technique is undesirable in high-frequency applications. Moreover, the output of a differentiator must be connected to a low impedance if fast rise and fall times of the pulse are to be maintained. This requirement necessitates a large coupling capacitor which cannot be readily integrated. Even with this condition met, amplitude of differentiated output pulses is still dependent on the amplitude and rise time of the input waveform and may change when modulation is applied. This causes undesired amplitude modulation of the output waveform.

To overcome these problems, a combination variable position pulse generation circuit and ramp generator including preemphasis network 22, deemphasis network 24 and differential comparator 26 has been developed. Preemphasis network 22 increases the relative amplitude of the high-frequency components at the leading and lagging edges of variable width pulses 18. The preemphasized output of network 22 is applied to a first input of ramp generator comparator 26. Deemphasis network 24 attenuates the high-frequency components thus rounding off the leading and lagging edges of pulse 18 and this output is applied to the second input of comparator 26. A direct current (DC) bias from bias circuit 28 is likewise applied to the second input of comparator 26 to establish the point at which the output of the comparator changes state. Comparator 26 is responsive to the amplified preemphasized, leading edges 29 of pulses 18 (shown by D in FIG. 2) to develop a modulated ramp signal 30 (shown by E in FIG. 2) simultaneously therewith. The operation of comparator 26 will be explained in detail in a subsequent portion of the specification.

The modulated ramp signal 30 is applied from the output of comparator 26 to one input of comparator 32. Audio signal 11 is applied from audio amplifier 12 to the other input of comparator 32. Audio signal 11 and modulated ramp 30 are compared in comparator 32, in the same manner that audio signal 11 and ramp 17 are compared in comparator 13, to generate a second variable width pulse train 34 (shown by F in FIG. 2). Because of the modulation imposed on ramp signal 30, the leading edge of the variable width pulses in train 34 are modulated to a greater extent than the leading edges of the pulses in train 18.

Output train 34 of comparator 32 is preemphasized by network 36 and deemphasized by network 38 which is connected from the output of comparator 32 to the inputs of comparator 40. Bias circuit 42 applies a DC bias to the same input of comparator 40 that is connected to deemphasis circuit 38. During the periods of time when the amplitude of the preemphasized output of network 36 exceeds the amplitude of the output of deemphasis network 38 plus the DC potential from bias circuit 42, comparator 40 generates narrow, variable position pulses 44 (as shown by G in FIG. 2). Since pulses 44 are initiated by the leading edge of variable width pulses 34, the position of pulse 44 is modulated to a greater degree by signal 11 as compared to the position of the variable position pulses 29. The variable position, output pulse train 44 of comparator 40 is filtered by filter 48 to develop a phase shifted, somewhat sinusoidal RF signal at output 49 wherein amount of phase shift is modulated by the instantaneous amplitude of modulating signal 11.

The configuration and operation of comparator or ramp generator 26 will now be described. Ramp generator 26, preemphasis network 22 and deemphasis network 24 are shown in schematic form in FIG. 3. As has been pointed out in the foregoing portion of this specification, the purpose of ramp generator 26 is to provide a modulated ramp signal 30 which is initiated simultaneously with the modulated leading edges 20 of variable pulse width signal 18. Ramp generator 26 includes a differential amplifier acting as a comparator formed by transistors 50 and 52. Transistor 54 and diode 56 form a constant current source for the differential amplifier. The emitters of transistors 50 and 52 are coupled to ground through transistor 54. A DC potential is applied from a supply connected between terminal 58 and the ground or reference potential.

The operation of comparator ramp generator 26 will first be explained as though only dotted load resistor 60 is connected across terminals 62 and 64. Ramp-linearizing circuit 66 will be considered as disconnected from terminals 62 and 64. The variable width output signal 18 from comparator 13 is coupled to base 59 of transistor 50 through preemphasis network 22 consisting of resistors 61 and 63 in parallel with capacitor 65. The preemphasis network is in series with resistor 68 which provides bias for transistor 50. Preemphasis network 22 attenuates the low-frequency component of waveform 18, a portion of which is shown by A in FIG. 4, thus forming waveform 70, shown by C in FIG. 4, at base 59 of transistor 50. Moreover, output waveform 18 of comparator 13 is coupled through resistor 61 and resistor 72 to base 74 of transistor 52. Resistor 61 and 72 together with the input capacitance of transistor 52 comprises deemphasis network 24 which attenuates the high-frequency portion of variable width pulse signal 18 thus forming pulse train 76, shown by B in FIG. 4, at base 74 of transistor 52. A DC offset bias is provided at the base of transistor 74 by resistors 61, 63 and 68.

Normally, deemphasized signal 76 biases transistor 52 to conduction and transistor 50 is normally biased off, thus maintaining a high potential at collector 78 of transistor 50. Since transistor 50 presents a high impedance when biased off, capacitor 80 (shown dotted), which is connected to collector 78, is charged by supply 58 through resistor 60 thus forming a rising voltage level thereacross which comprises the rising portion of ramp signal 86, shown by E in FIG. 4

However, as the amplitude of the modulated leading edge 82 of preemphasized pulses or control signal 70 exceeds the amplitude of the leading edges 84 of the deemphasized pulses 76 plus the DC offset bias, transistor 50, which may be thought of as a switch, is turned on or rendered conductive for a brief period of time with the modulated leading edges 82. Transistor 50 thereby momentarily forms a low impedance which discharges capacitor 80 to form the falling portion of modulated ramp signal 86 shown by E in FIG. 4. The collector current waveform 87 for transistor 50, as it discharges capacitor 80, is shown by D in FIG. 4.

If it is desired to form a high-frequency phase-modulated signal at output 49 of the tandem serrasoid modulator shown in FIG. 1, the pulses of waveform 18 must have a high repetition rate. Thus preemphasized wave train 70 which is applied to the base of transistor 50 must likewise have high frequency components. Because of its structure, the base-to-collector junction of transistor 50 has an inherent capacitance 89 between base 59 and collector 78. The impedance of this capacitance varies inversely with frequency. Because of capacitance 89, even though transistor 50 is biased off, when high-frequency waveform 70 changes toward its negative-most amplitudes at points 88, small current pulses 90 (shown by D in FIG. 4) are coupled through the base-to-collector junction of transistor 50. Since, as shown by E in FIG. 4, capacitor 80 is charging to generate waveform 86 at the instant in time when current pulse 90 is distorted at point 92. Distortion 92 on ramp signal 86 can provide unwanted distortion in the signal at output 49 of the tandem, serrasoid modulator shown in FIG. 1.

To overcome this problem, ramp-linearizing circuit 66 has been inserted between terminals 62 and 64 in addition to load resistance 60 which, in the past, has been connected between terminals 62 and 64. Capacitor 80 is to be considered as being disconnected for the purposes of the subsequent portion of this specification Collector 78 of transistor 50 is coupled through the parallel circuit comprised of capacitor 108 and resistor 110 to base 112 of linearizing transistor 114 and, in addition, through resistor 60 to bias terminal 58. Resistor 116, which is connected from bias terminal 58 to base 112 of transistor 114, supplies bias thereto. The configuration of resistors 60, 110 and 116 form a current path for collector 78 of transistor 50. Transistor 114 is connected in a common emitter configuration with its collector connected through load resistor 118 to a ground or reference potential and through DC blocking capacitor 120 to base of transistor 122. Resistor 124 connects the base of transistor 122 to ground.

Transistor 122 is likewise connected in a common emitter configuration with its emitter connected to ground and its collector 126 connected though load resistor 128 to the bias line. One end of resistor 128 is also connected through ramp-forming capacitor 130 to ground. Output terminal 132 of ramp-linearizing circuit 66 is connected to one input of comparator 32 (FIG. 1) for applying a modulated ramp signal having greater linearity thereto.

Figures 3, 4:
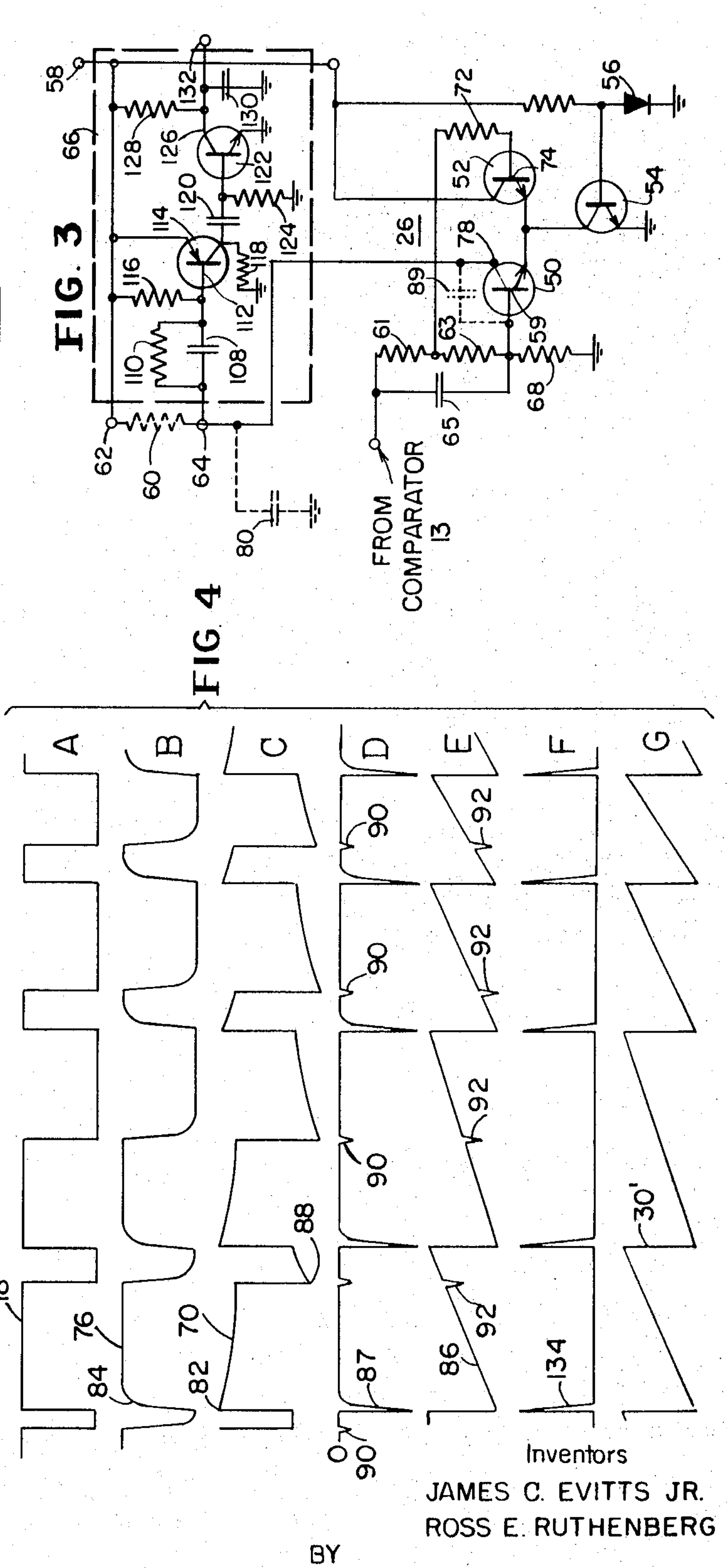
FIG. 3 is a schematic diagram of a modulated ramp generator including a ramp-linearizing circuit.
FIG. 4 is a family of waveforms illustrating the operation of the circuit of FIG. 3.

Considering the operation of ramp-linearizing circuit 66, the collector current waveforms 87 with unwanted portions 90 located thereon of transistor 50, as shown by D in FIG. 4, are coupled through capacitor 108 and resistor 110 to base 112 of transistor 114, which is of the opposite conductivity type as compared to transistor 50. Since portions 90 do not have sufficient amplitude to forward bias or overcome the threshold of the base-emitter junction of transistor 114, they do not cause collector current to flow through load resistor 118. Hence, the output waveform of the collector current for transistor 114 contains only desired timing pulses 134, shown by F in FIG. 4, which are inverted with respect to pulses 87 as shown by D in FIG. 4. Since transistor 122, which is of the same conductivity type as transistor 50 and opposite conductivity type as transistor 114, is likewise a common emitter amplifier, it inverts pulses 134 thereby forming a waveform at its collector similar to that of pulses 87, shown by D in FIG. 4, but with unwanted portions 90 being eliminated therefrom. Thus transistor 122 is turned on at a proper time to discharge capacitor 130 therethrough which subsequently recharges through resistor 128 to form an improved, modulated ramp signal 30' (shown by G in FIG. 2) at output terminal 132. Ramp signal 30' doesn't have distortion 92 located thereon. This ramp signal is coupled from output 132 to comparator 32 as shown in FIG. 1.

What has been described therefore is a high-frequency modulated, ramp generator having a linearizing circuit for a tandem serrasoid modulator. The linearizing circuit eliminates unwanted distortion otherwise occuring on the ramp signal caused by a portion of an energizing pulse being coupled through the base-to-collector junction capacitance of a nonconducting transistor. The improvement facilitates the utilization of the tandem serrasoid modulation techniques at higher frequencies than would otherwise be feasible.

We Claim:

1. A generator for developing a high-frequency ramp signal, including in combination:
- ramp-forming capacitor means having first and second plates, said first plate being connected to a reference potential;
- voltage supply means coupled to said second plate thereby charging said ramp-forming capacitor means to thereby generate the rising portion of the ramp signal;
- control signal means providing a control signal at the output thereof having positive and negative excursions;
- switch means having control, input and output electrodes, said control electrode being coupled to said output of said control signal means, said input electrode being coupled to said reference potential, said switch means being rendered conductive in response to one of said positive or negative excursions of said control signal to couple said reference potential to said output electrode thereof, said switch means coupling an undesired signal to said output electrode thereof in response to the other of said excursions;
- ramp-linearizing circuit means including threshold means and having input and output terminals, said input terminal being coupled to said output electrode of said switch means, said output terminal being coupled to said second plate of said capacitor means, said threshold means being rendered conductive in response to said reference potential being applied thereto by said switch means thereby rapidly discharging said ramp-forming capacitor means to generate the falling portion of the ramp, said threshold means remaining nonconductive in response to said undesired signal thereby isolating said ramp-forming capacitor therefrom so that said ramp signal is not distorted by said undesired signal.

2. The generator of claim 1 wherein said control signal means includes a preemphasis network energized by a variable width pulse.

3. The generator of claim 1 wherein said switch means is a transistor and wherein said control, input and output electrodes are respectively the base, emitter and collector electrodes thereof.

4. The generator of claim 1 wherein said threshold means of said ramp-linearizing circuit is a first transistor having first input, output and control electrodes.

5. The ramp generator of claim 4 wherein said ramp-linearizing circuit includes:
- first resistive means connected from said input terminal to said voltage supply means;
- first capacitive means connected from said input terminal to said first control electrode of said first transistor;
- second resistive means connected in parallel with said first capacitive means;
- third resistive means connected from said first control electrode to said voltage supply means;
- said first input electrode being directly connected to said voltage supply means;
- fourth resistive means connected from said first output electrode to said reference potential, said first transistor being rendered conductive in response to said reference potential being supplied through said switching means to thereby form a potential difference with respect to said reference potential at said first output electrode thereof, said first transistor being nonresponsive to said undesired signal;
- second transistor having an opposite conductivity type from said first transistor and having a second control, input and output electrodes;
- second capacitive means coupling said first output electrode to said second control electrode;
- fifth resistive means connecting said second control electrode to the reference potential;
- sixth resistive means connected from said ramp-forming capacitor means to said voltage supply means;
- said second input electrode being directly coupled to said reference potential, said second output electrode being connected to said second plate of said ramp-forming capacitor means, said second transistor being rendered conductive by said potential difference at said first output electrode to conduct said reference potential to said ramp-forming capacitor thereby discharging the same to form the falling portion of the ramp signal.